US012119029B1

(12) United States Patent
Zhang et al.

(10) Patent No.: US 12,119,029 B1
(45) Date of Patent: Oct. 15, 2024

(54) VIDEO EDITING METHOD AND APPARATUS, DEVICE AND MEDIUM

(71) Applicant: Beijing Zitiao Network Technology Co., Ltd., Beijing (CN)

(72) Inventors: Xiaohe Zhang, Beijing (CN); Zheng Zhen, Beijing (CN); Chengzuo Sun, Beijing (CN); Yu Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/391,385

(22) Filed: Dec. 20, 2023

Related U.S. Application Data

(63) Continuation of application No. PCT/CN2023/132713, filed on Nov. 20, 2023.

(30) Foreign Application Priority Data

Mar. 28, 2023 (CN) .......................... 202310316394.0

(51) Int. Cl.
| | |
|---|---|
| G11B 27/10 | (2006.01) |
| G11B 27/00 | (2006.01) |
| G11B 27/036 | (2006.01) |
| H04N 1/21 | (2006.01) |
| H04N 21/00 | (2011.01) |

(52) U.S. Cl.
CPC ................................ *G11B 27/036* (2013.01)

(58) Field of Classification Search
CPC .......... G11B 27/10; G11B 27/00; H04N 1/21; H04N 21/00
USPC .......................... 386/278, 282, 239, 248, 241
See application file for complete search history.

(56) References Cited

U.S. PATENT DOCUMENTS

| 11,430,484 B1 * | 8/2022 | Fortunato ............ G11B 27/031 |
| 2012/0210231 A1 * | 8/2012 | Ubillos ................ G11B 27/034 |
| | | 715/723 |

* cited by examiner

*Primary Examiner* — Daquan Zhao
(74) *Attorney, Agent, or Firm* — BakerHostetler

(57) ABSTRACT

Embodiments of the present disclosure provide a video editing method, apparatus, a device and a medium. The method includes: acquiring a video editing template, wherein the video editing template is generated based on first multimedia data; displaying a video editing interface based on the video editing template, a video editing track based on a timeline is presented on the video editing interface, a first video track clip is presented on the video editing track, the first video track clip corresponds to a second video track clip formed by a first multimedia material in the first multimedia data; and in response to a material import operation for the first video track clip, replacing the first video track clip with a third video track clip to obtain second multimedia data, wherein the first multimedia material in the first multimedia data is replaced with a second multimedia material in the second multimedia data.

20 Claims, 10 Drawing Sheets

First video track clip

Second video track clip

Fifth video track clip

Fifth video track clip

VIDEO EDITING METHOD AND APPARATUS, DEVICE AND MEDIUM

CROSS-REFERENCE TO RELATED APPLICATION(S)

This application is a Continuation Application of International Patent Application No. PCT/CN2023/132713, filed on Nov. 20, 2023, which claims priority to Chinese Application No. 202310316394.0 filed on Mar. 28, 2023, the disclosures of which are incorporated herein by reference in their entities.

FIELD

The present disclosure relates to the technical field of computer applications, and in particular, to a video editing method and apparatus, a device and a medium.

BACKGROUND

With the development of computer technology, sharing and dissemination of information with video as a carrier has become a mainstream, such as the promotion of food through videos.

However, with the diversity of video promotion scenarios, video editing requirements are more and more diversified. In order to meet the diversified video editing requirements, multiple editing operations need to be performed on a video, so that a duration of video editing is relatively long. Thus, there is an urgent need for a method for improving editing efficiency for a video.

SUMMARY

In order to solve the above technical problems or at least partially solve the above technical problems, the present disclosure provides a video editing method and apparatus, a device and a medium, which method and apparatus improve the efficiency and flexibility of video editing.

Embodiments of the present disclosure provide a video editing method, including: acquiring a video editing template, wherein the video editing template is generated based on first multimedia data, the first multimedia data includes at least one multimedia material and editing information, the editing information is configured to indicate an editing operation for the at least one multimedia material, the video editing template includes marking information, and the marking information is configured to indicate that a first multimedia material in the at least one multimedia material is marked as a replaceable material; displaying a video editing interface based on the video editing template, wherein a video editing track based on a timeline is presented on the video editing interface, a first video track clip is presented on the video editing track, and the first video track clip corresponds to a second video track clip formed by the first multimedia material in the first multimedia data; and in response to a material import operation for the first video track clip, replacing the first video track clip with a third video track clip, so as to obtain second multimedia data, wherein the third video track clip corresponds to a fourth video track clip that is formed by a second multimedia material indicated by the material import operation, the first video track clip and the third video track clip occupy the same timeline position on the video editing track; and according to a comparison between the second multimedia data the first multimedia data, the first multimedia material in the first multimedia data is replaced with the second multimedia material in the second multimedia data.

The embodiments of the present disclosure further provide a video editing apparatus, wherein the apparatus includes: an acquisition module, configured to acquire a video editing template, wherein the video editing template is generated based on first multimedia data, the first multimedia data includes at least one multimedia material and editing information, the editing information is configured to indicate an editing operation for the at least one multimedia material, the video editing template includes marking information, and the marking information is configured to indicate that a first multimedia material in the at least one multimedia material is marked as a replaceable material; a display module, configured to display a video editing interface based on the video editing template, wherein a video editing track based on a timeline is presented on the video editing interface, a first video track clip is presented on the video editing track, and the first video track clip corresponds to a second video track clip formed by the first multimedia material in the first multimedia data; and a replacement module, configured to: in response to a material import operation for the first video track clip, replace the first video track clip with a third video track clip, so as to obtain second multimedia data, wherein the third video track clip corresponds to a fourth video track clip that is formed by a second multimedia material indicated by the material import operation, the first video track clip and the third video track clip occupy the same timeline position on the video editing track; and according to a comparison between the second multimedia data the first multimedia data, the first multimedia material in the first multimedia data is replaced with the second multimedia material in the second multimedia data.

The embodiments of the present disclosure further provide an electronic device, wherein the electronic device includes: a processor; and a memory for storing a processor-executable instruction; and the processor is configured to read the executable instruction from the memory, and executing the instruction to implement the video editing method provided in the embodiments of the present disclosure.

The embodiments of the present disclosure further provide a computer-readable storage medium, wherein the storage medium stores a computer program, and the computer program is configured to execute the video editing method provided in the embodiments of the present disclosure.

Compared with the prior art, the technical solutions provided in the embodiments of the present disclosure have the following advantages:

According to the video editing solution provided in the embodiments of the present disclosure, the video editing template is acquired, wherein the video editing template is generated based on the first multimedia data, the first multimedia data includes at least one multimedia material and editing information, the editing information is configured to indicate the editing operation for the at least one multimedia material, the video editing template includes marking information, and the marking information is configured to indicate that the first multimedia material in the at least one multimedia material is marked as the replaceable material; the video editing interface is displayed based on the video editing template, wherein the video editing track based on the timeline is presented on the video editing interface, the first video track clip is presented on the video editing track, and the first video track clip corresponds to the second video track clip formed by the first multimedia material in the first multimedia data; and in response to the material import operation for the first video track clip, the first video track clip is replaced with the third video track clip, so as to obtain the second multimedia data, wherein the third video track clip corresponds to the fourth video track clip that is formed by the second multimedia material indicated by the material import operation, the first video track clip and the third video track clip occupy the same timeline position on the video editing track; and according to a comparison between the second multimedia data the first multimedia data, the first multimedia material in the first multimedia data is replaced with the second multimedia material in the second multimedia data. Therefore, video editing based on the video editing template is realized, and the efficiency and flexibility of video editing are improved.

BRIEF DESCRIPTION OF THE DRAWINGS

The above and other features, advantages and aspects of embodiments of the present disclosure will become more apparent in combination with the drawings and with reference to specific implementations. Throughout the drawings, the same or similar reference signs indicate the same or similar elements. It should be understood that the drawings are schematic and that original components and elements are not necessarily drawn to scale.

DETAILED DESCRIPTION OF EMBODIMENTS

Figure 1:
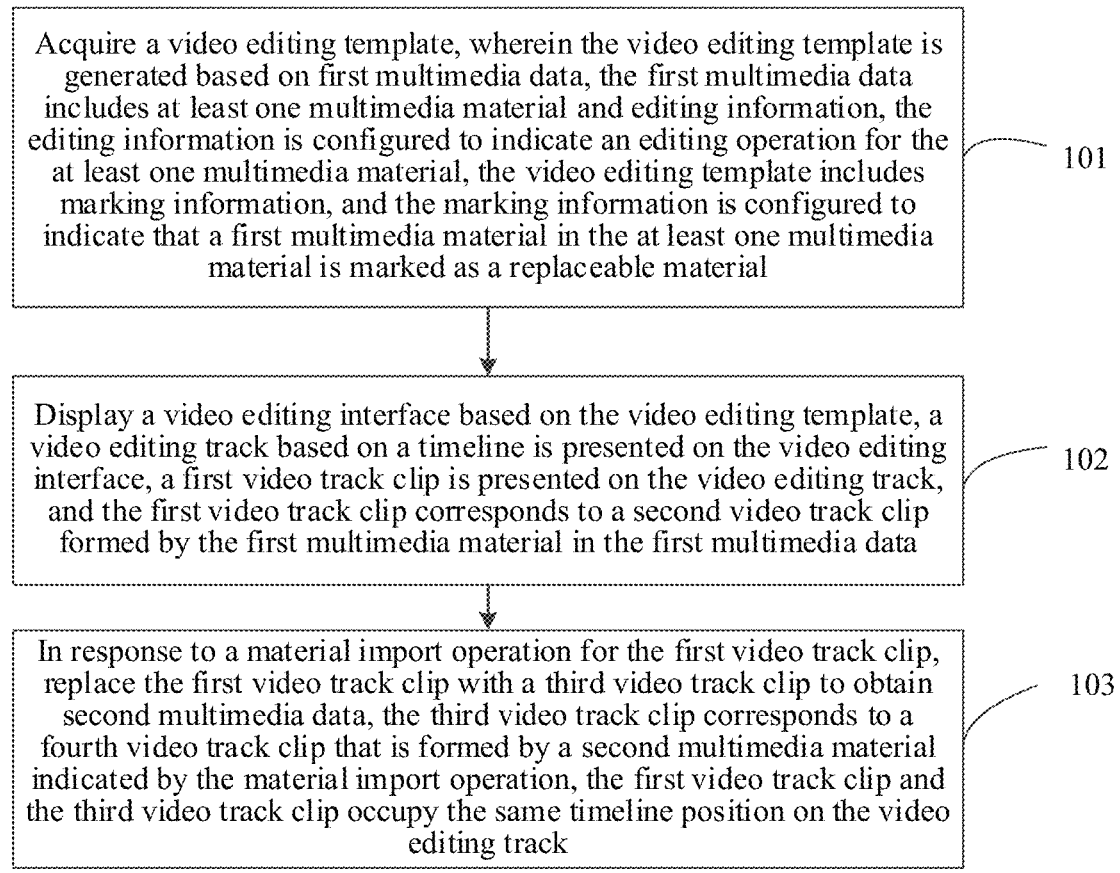
FIG. 1 is a schematic flowchart of a video editing method provided according to an embodiment of the present disclosure.

Hereinafter, embodiments of the present disclosure will be described in more detail with reference to the drawings.

While certain embodiments of the present disclosure have been illustrated in the drawings, it is to be understood that the present disclosure may be embodied in various forms and should not be construed as being limited to the embodiments set forth herein; rather, these embodiments are provided to help understand the present disclosure more thoroughly and completely. It should be understood that the drawings and embodiments of the present disclosure are for exemplary purposes only and are not intended to limit the protection scope of the present disclosure.

It should be understood that various steps recited in method embodiments of the present disclosure may be performed in a different order and/or in parallel. In addition, the method embodiments may include additional steps and/ or omit performing the steps as shown herein. The scope of the present disclosure is not limited in this respect.

As used herein, the terms "include" and variations thereof are open-ended terms, i.e., "include, but not limited to." The term "based on" is "based, at least in part, on." The term "one embodiment" means "at least one embodiment," the term "another embodiment" means "at least one further embodiment," the term "some embodiments" means "at least some embodiments." Relevant definitions of other terms will be given in the following description.

It should be noted that definitions such as "first" and "second" mentioned in the present disclosure are only intended to distinguish between different apparatuses, modules or units, and are not intended to limit the order or interdependence of the functions performed by these apparatuses, modules or units.

It should be noted that the modifiers such as "one" and "more" mentioned in the present disclosure are intended to be illustrative and not restrictive, and those skilled in the art should understand that they should be interpreted as "one or more" unless the context clearly indicates otherwise.

The names of messages or information interacted between multiple apparatuses in the embodiments of the present disclosure are for illustrative purposes only and are not intended to limit the scope of such messages or information.

In order to solve the above problems, an embodiment of the present disclosure provides a video editing method. In the method, a video editing template may be multiplexed for video editing, thereby improving the video editing efficiency and flexibility.

The method is described below in conjunction with specific embodiments.

FIG. 1 is a schematic flowchart of a video editing method provided according to an embodiment of the present disclosure. The method may be executed by a video editing apparatus, wherein the apparatus may be implemented using software and/or hardware, and may be generally integrated into an electronic device. As shown in FIG. 1, the method includes:

Step 101, acquiring a video editing template, wherein the video editing template is generated based on first multimedia data; the first multimedia data includes at least one multimedia material and editing information, the editing information is configured to indicate an editing operation for the at least one multimedia material; the video editing template includes marking information, the marking information is configured to indicate that a first multimedia material in the at least one multimedia material is marked as a replaceable material.

In one embodiment of the present disclosure, a video editing template is acquired, the video editing template is generated based on first multimedia data, the first multimedia data includes at least one multimedia material such as a picture, a text, an audio and the like. The first multimedia data may further include editing information, which is configured to indicate an editing operation for the at least one multimedia material. For example, each multimedia data may include multiple editing tracks, each editing track contains a piece of editing information for the corresponding multimedia material. For example, a multimedia data A contains a text editing track, an audio editing track, an image editing track or the like, and the editing operation in the present embodiment may be an editing operation for editable information of any track in the multimedia data. For example, an editing operation may be image effect processing in the image editing track, etc.

Figure 2:
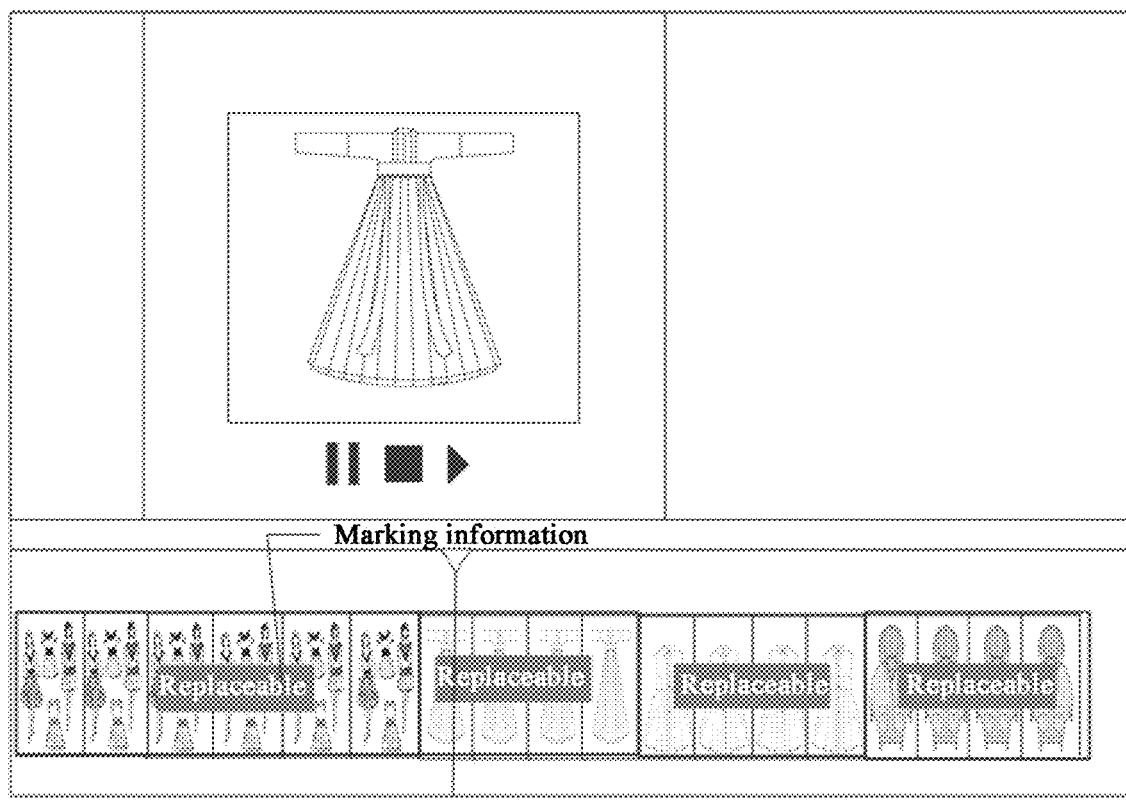
FIG. 2 is a schematic diagram of a video editing scenario provided according to an embodiment of the present disclosure.

It is not difficult to understand that, the video editing template itself is the first multimedia data in the form of a video. In order to conveniently process the corresponding first multimedia data into the video editing template, in one embodiment of the present disclosure, a first multimedia material in the at least one multimedia material is marked, by indication of marking information, as the replaceable material, wherein in order to facilitate the application of the video editing template, the marking information may be visually displayed on the corresponding multimedia material, and the display style of the marking information may be set according to scenario requirements. For example, as shown in FIG. 2, the marking information may be a text style of "replaceable".

Step 102, displaying a video editing interface based on the video editing template, wherein a video editing track based on a timeline is presented on the video editing interface, a first video track clip is presented on the video editing track, and the first video track clip corresponds to a second video track clip formed by the first multimedia material in the first multimedia data.

Figure 3:
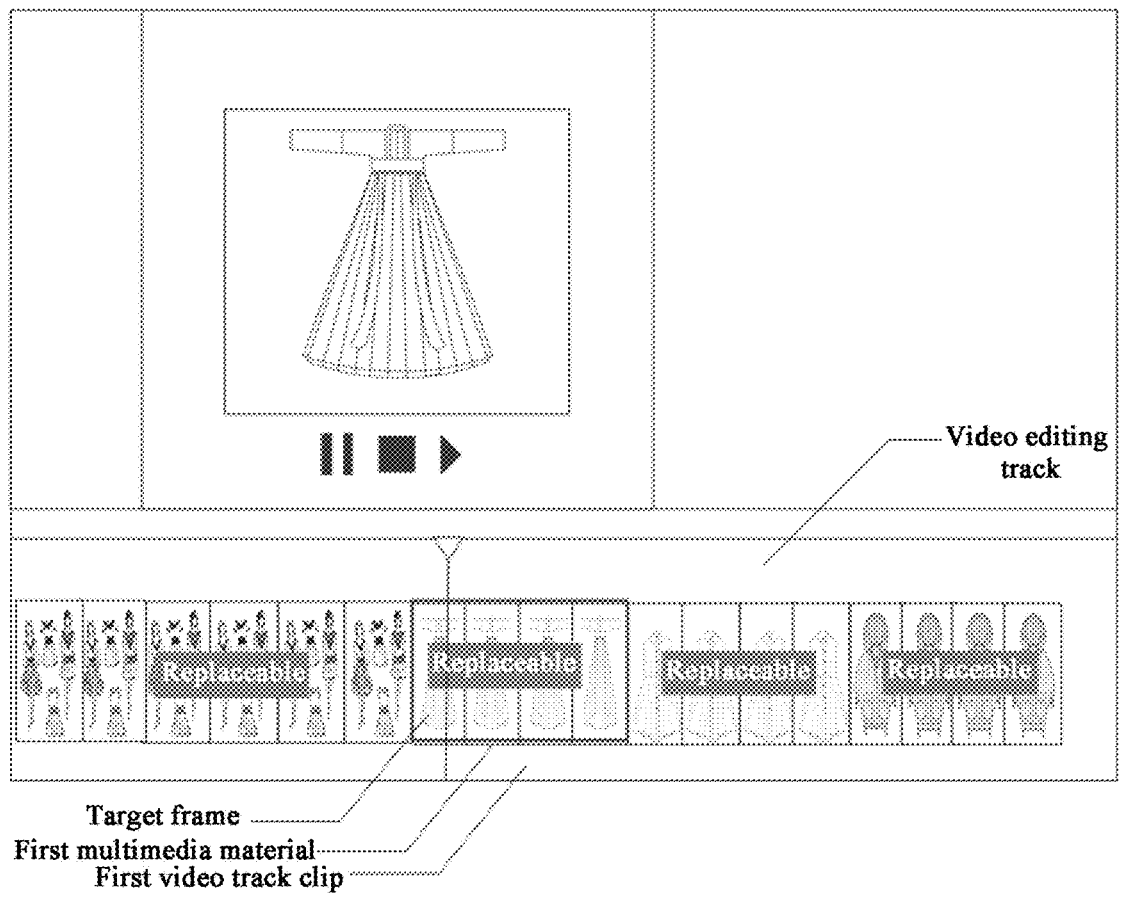
FIG. 3 is a schematic diagram of another video editing scenario provided according to an embodiment of the present disclosure.

In one embodiment of the present disclosure, a video editing interface is displayed based on the video editing template, so as to multiplex the video editing template on the video editing interface. As shown in FIG. 3, a video editing track based on a timeline is presented on the video editing interface. A first video track clip is presented on the video editing track, the first video track clip is corresponding to a second video track clip formed by the first multimedia material in the first multimedia data, wherein the first video track clip may be the second video track clip, the first video track clip may be a video track clip generated by a target image frame in a freeze-frame manner, and the target image frame is an image frame in the first multimedia material.

Figure 4:
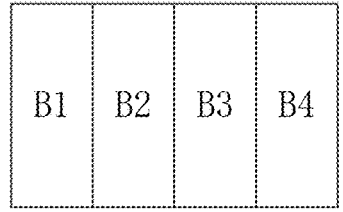
FIG. 4 is a schematic diagram of another video editing scenario provided according to an embodiment of the present disclosure.
Figure 4:
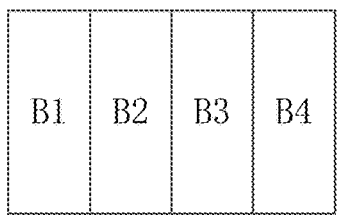
Figure 4:
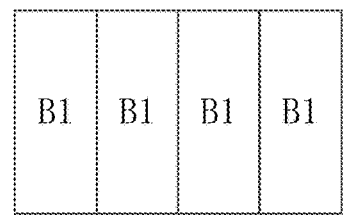

That is, the first video track clip displayed on the video editing interface may be directly the second video track clip formed by the first multimedia material, or may also be a certain image frame in the first multimedia material. For example, as shown in FIG. 4, when the first multimedia data contains a video clip, the video clip contains image frames B1-B4, then the first video track clip may be the second video track clip composed of B1-B4 or may also be a video track clip generated by B1 in the freeze-format manner.

Step 103, in response to a material import operation for the first video track clip, replacing the first video track clip with a third video track clip to obtain second multimedia data, the third video track clip corresponds to a fourth video track clip that is formed by a second multimedia material indicated by the material import operation. The first video track clip and the third video track clip occupy the same timeline position on the video editing track.

According to a comparison between the second multimedia data and the first multimedia data, the first multimedia material in the first multimedia data is replaced with the second multimedia material in the second multimedia data.

In one embodiment of the present disclosure, the material import operation may be directly performed on the first video track clip, and the first video track is replaced with the third video track clip, to obtain the second multimedia data. Accordingly, the multiplexing of the related video editing template is implemented.

The third video track clip corresponds to the fourth video track clip that is formed by the second multimedia material indicated by the material import operation. In one embodiment of the present disclosure, after the second multimedia data is acquired, the second multimedia data may be exported, a video export operation is acquired. The video export operation may be implemented by triggering a preset export control, or may also be implemented by executing another binding events corresponding to the export operation. For example, in some alternative implementations, the export operation may be implemented by double clicking the current video editing page, etc.

In one embodiment of the present disclosure, in response to the video export operation, it is detected whether the first video track clip is replaced with the third video track clip. If the replacement is completed, a target video is directly generated based on the second multimedia data. A user may further perform an operation such as saving or sharing on the target video. If the replacement is not completed, replacement guidance prompt is performed for the first video track clip. For example, text prompt information is displayed to prompt the user that the current first video track clip is not replaced and whether to generate the target video by using the first video track clip, etc. In the present embodiment, after it is detected that all first video track clips are replaced with the third video track clip, it is determined that the replacement is completed. Alternatively, after a part of first video track clips is replaced with the third video track clip, it is determined that the replacement is completed. In a situation that a part of first video track clips are replaced with the third video track clip, the first video track clip(s) that is not replaced with the third video track clip may be highlighted when the replacement guidance prompt is performed for the first video track clip(s). For example, a corresponding first video track clip that is not replaced with the third video track clip is framed in a rectangular frame. In some possible embodiments, a target video clip may also multiplex the first video track clip. For example, when a video export confirmation operation is acquired after the replacement guidance prompt is received, all the current video track clips are exported as the target video.

It should be noted that, in the present embodiment, the first video track clip and the third video track clip occupy the same timeline position on the video editing track. Therefore, an operation of replacing the first video track clip with the third video track clip at the same timeline position may be implemented.

In one embodiment of the present disclosure, in order to ensure that the first video track clip is aligned with the corresponding third video track clip on a time axis, a first duration corresponding to the second multimedia material is compared with a second duration of the first video track clip. If the first duration is less than the second duration, the playback speed of the second multimedia material is slowed down, so that a playback duration of the adjusted video clip is the second duration. For example, a playback duration of each frame in the second multimedia material is determined according to a duration difference between the second duration and the first duration. The second multimedia material is played for the duration to adjust the playback duration of the video clip corresponding to the second multimedia material.

If the first duration is greater than the second duration, material interception is performed starting from a first frame of the second multimedia material, so that a playback duration of a video clip generated by the intercepted second multimedia material is the second duration. That is, a video clip having the same playback duration as the second duration is intercepted from the second multimedia material to serve as the third video track clip. Of course, in some possible embodiments, a difference value between the first duration and the second duration may also be calculated. The playback duration of each frame in the second multimedia material is determined according to the difference value. The second multimedia material is played for the duration to adjust the playback duration of the video clip corresponding to the second multimedia material, so that the playback duration of the adjusted second multimedia material is the same as the second duration, and thus there is no need to intercept the second multimedia material.

In addition, in the embodiments of the present disclosure, according to a comparison between the second multimedia data the first multimedia data, the first multimedia material in the first multimedia data is replaced with the second multimedia material in the second multimedia data, wherein the editing operation for the first multimedia material is retained to multiplex the video editing template.

In one embodiment of the present disclosure, in order to further meet the requirements for video editing, material editing may also be performed on the second multimedia material. That is, in one embodiment of the present disclosure, after the first video track clip is replaced with the third video track clip to obtain the second multimedia data, in response to an editing operation for the second multimedia material (for example, in response to a preset trigger operation for the second multimedia material, as another example, in response to a trigger operation for a preset editing control), a material editing area is displayed, wherein the material editing area contains multiple editing menus (including a color editing menu of the second multimedia material and the like) for the second multimedia material, and the second multimedia material may be edited in the material editing area. Therefore, the second multimedia data may be edited on a video template editing interface of the current second multimedia data without skipping to another video editing interface, thereby further improving the video editing efficiency.

Figure 5:
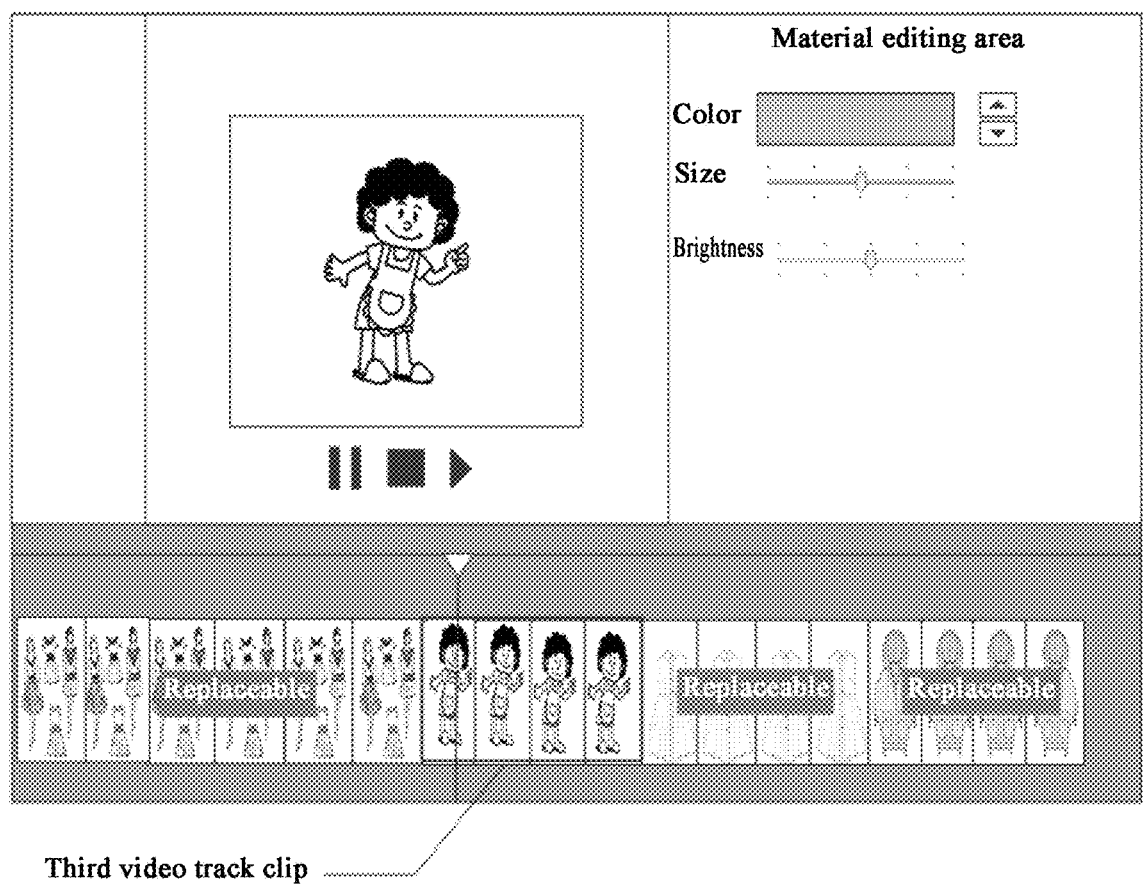
FIG. 5 is a schematic diagram of another video editing scenario provided according to an embodiment of the present disclosure.

For example, as shown in FIG. 5, after the first video track clip is replaced with the third video track clip to obtain the second multimedia data, the material editing area of the second multimedia material corresponding to the current time axis may be displayed. The material editing area may contain a size adjustment editing menu, a color adjustment editing menu, a brightness adjustment editing menu and the like of the second multimedia material. The second multimedia material may be edited in the material editing area.

In one embodiment of the present disclosure, secondary editing may also be performed on an editing operation in the first multimedia data, so as to multiplex the secondary editing result for the subsequent second multimedia data. For example, at least one replaceable text clip in the first multimedia data is displayed in a text area on the video editing interface.

Further, in response to a selection operation for a selected target text clip in the text area, the target text clip may be an editable text clip in the multimedia material in the first multimedia data. At least one video frame is marked on the video editing track based on the timeline, wherein the video frame corresponds to a position where the target text clip is played in the first multimedia data. The video frame corresponding to the timeline may be actively selected by the user. Alternatively, video frame content information of each video frame in the first multimedia data may also be recognized, and it is determined according to the video frame content information whether to match with the target text clip. The video frame corresponding to the target text clip is determined according to a matching result. A corresponding relationship between each replaceable text clip and the corresponding video frame may also be set. The corresponding video frame may be determined by querying a preset corresponding relationship after the target text clip is selected. In response to an editing operation for the target text clip, an edited text clip is synchronously displayed on a video player, wherein the edited text clip may be embodied in the second multimedia data.

Figure 6:
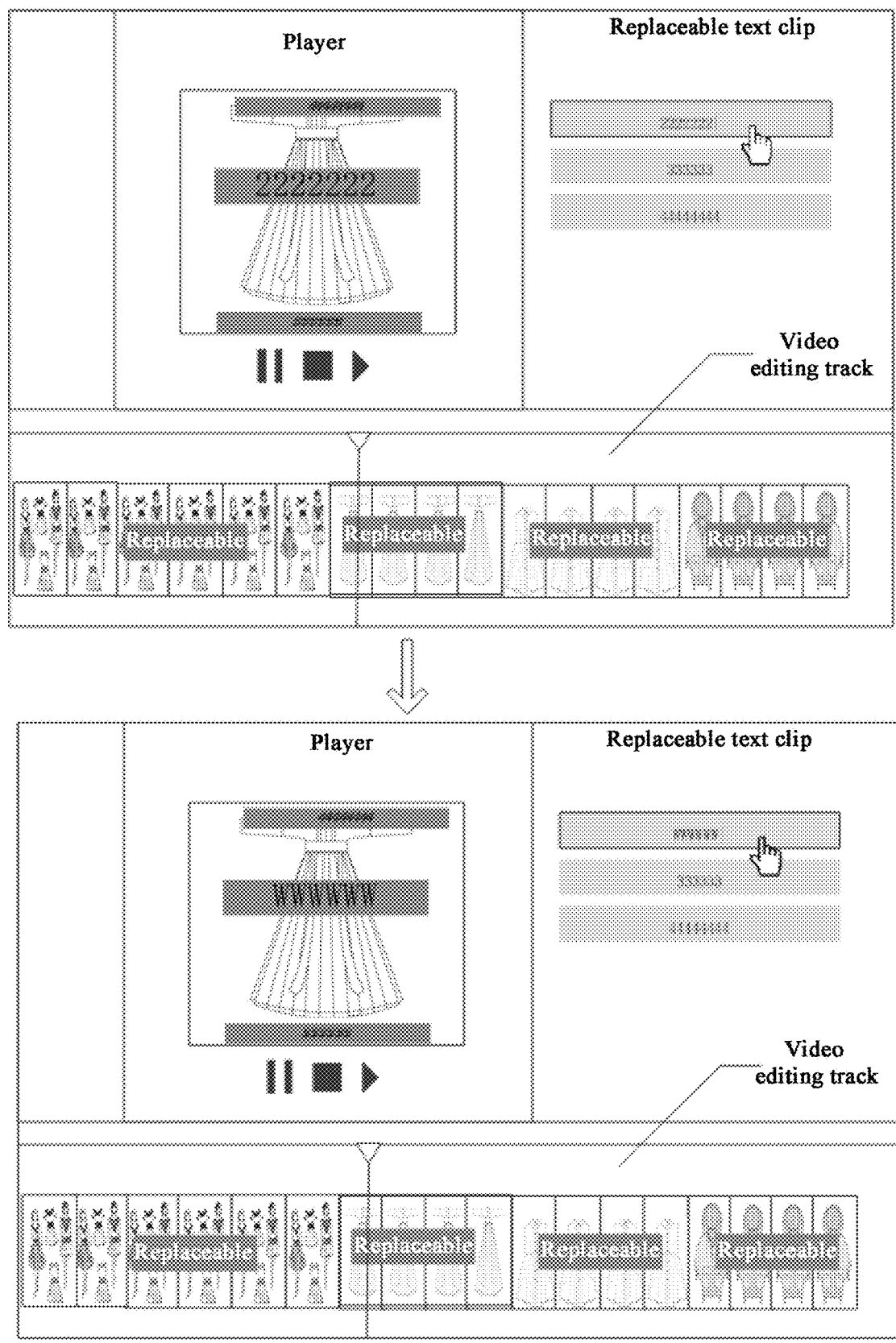
FIG. 6 is a schematic diagram of another video editing scenario provided according to an embodiment of the present disclosure.

For example, as shown in FIG. 6, in the text area on the video editing interface, replaceable text clips of "2222222", "333333" and "44444444" in the first multimedia data are displayed. In response to an editing operation for the selected replaceable text clip "2222222" in the text area, a video frame (a video frame in the rectangular frame as shown in FIG. 6) is marked on the video editing track based on the timeline. In response to an editing operation for the target text clip, the edited text clip corresponding to the editing operation is "wwww". Then a corresponding text clip wwww is synchronously displayed on the player.

In an actual execution process, another editing track for editing the first video track clip may also be presented on the video editing interface. The another editing track may include an editing track such as a clipping track, a speed change track for the first video track clip. Alternatively, another editing track for editing the third video track clip may further be presented on the video editing interface. Similarly, the another editing track may include an editing track such as a clipping track, a speed change track for the third video track clip. Therefore, additional editing requirements for video editing are met, and another editing operation may be implemented on the video editing interface without skipping to another page, thereby further improving the video editing efficiency.

In summary, according to the video editing method in the embodiments of the present disclosure, the video editing template is acquired, wherein the video editing template is generated based on the first multimedia data, the first multimedia data includes at least one multimedia material and editing information, the editing information is configured to indicate an editing operation for the at least one multimedia material, the video editing template includes marking information, the marking information is configured to indicate that a first multimedia material in the at least one multimedia material is marked as the replaceable material; the video editing interface is displayed based on the video editing template, a video editing track based on the timeline is presented on the video editing interface, a first video track clip is presented on the video editing track, and the first video track clip corresponds to a second video track clip formed by the first multimedia material in the first multimedia data; and in response to a material import operation for the first video track clip, the first video track clip is replaced with the third video track clip to obtain second multimedia data, the third video track clip corresponds to a fourth video track clip that is formed by the second multimedia material indicated by the material import operation, and the first video track clip and the third video track clip occupy the same timeline position on the video editing track; wherein according to a comparison between the second multimedia data the first multimedia data, the first multimedia material in the first multimedia data is replaced with the second multimedia material in the second multimedia data. Therefore, video editing based on the video editing template is implemented, and the efficiency and flexibility of video editing are improved.

As can be seen based on the above embodiments, in the video editing method provided according to embodiments of the present disclosure, the first video track clip is replaced with the third video track clip to generate the second multimedia data. The first video track clip and the third video track clip occupy the same timeline position on the video editing track, and the second multimedia data and the first multimedia data contain multiple video track clips with the same timeline. The editing operation for each video track clip may multiplex the editing operation corresponding to the first multimedia material in the first multimedia data, thereby multiplexing the video editing template may be implemented.

How to replace the first video track clip with the third video track clip will be described below in conjunction with specific embodiments.

Figure 7A:
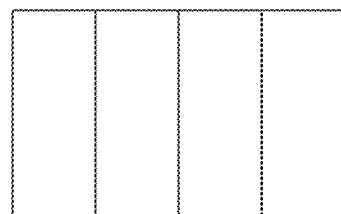
FIG. 7A is a schematic diagram of another video editing scenario provided according to an embodiment of the present disclosure.
Figure 7A:
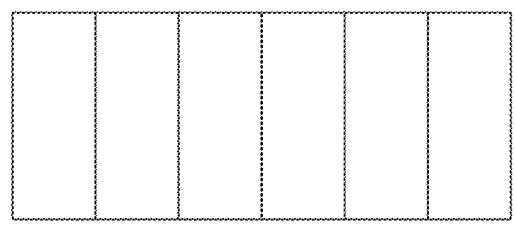
Figure 7A:
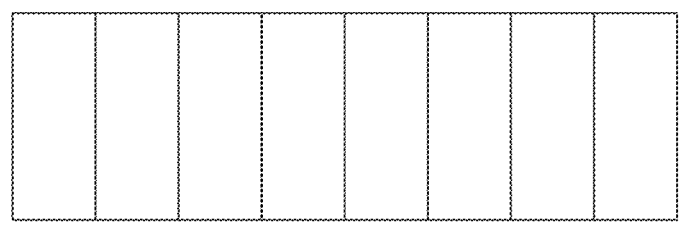

In one embodiment of the present disclosure, the at least one multimedia material corresponding to the first multimedia data further includes a third multimedia material. That is, the first video track clip is a composite video clip, and the first video track clip corresponds to a combination of the second video track clip and a fifth video track clip. The fifth video track clip is a video track clip formed by the third multimedia material in the first multimedia data. The second video track clip and the fifth video track clip have an overlapping portion on the timeline. The composite video clip may be visually displayed on the video editing track. For example, corresponding first video track clip containing "3 video clips, and the like" is displayed in the video editing track. After the composite video clip is selected, multiple corresponding video clips are displayed in a list or in another form, and the user may replace the video clips therein. As shown in FIG. 7A, when the first video track clip is a composite video clip, in addition to the second video track clip, the first video track clip may further include at least one fifth video track clip formed by the third multimedia material (two fifth video track clips are shown in FIG. 7A), wherein the multiple video clips having an overlapping portion on the timeline, and the overlapping may be an overlapping in any form. For example, the multiple video clips may have the same start time while may have not a completely different end time. For example, the start times and the end times of the multiple video clips may not completely the same, etc.

In the present embodiment, in response to a material import operation for the first video track clip, a first sub-clip and a second sub-clip of the second video track clip may be displayed according to a timeline sequence in response to a trigger operation for the first video track clip, wherein the first sub-clip herein may be understood as corresponding to the second video track clip, and the second sub-clip may be understood as corresponding to the fifth video track clip. Then, in response to a first import operation for the first sub-clip, the first sub-clip is replaced with a third sub-clip, wherein the third sub-clip corresponds to the fourth video track clip. In the present embodiment, in response to a material import operation for the second sub-clip, the second sub-clip is replaced with a fourth sub-clip, wherein the fourth sub-clip corresponds to a sixth video track clip formed by a fourth multimedia material. The material import operation may include a first import operation and a second import operation. The first import operation is configured to instruct to import the second multimedia material into the first sub-clip, and the second import operation is configured to instruct to import the fourth multimedia material into the second sub-clip.

Figure 7B:
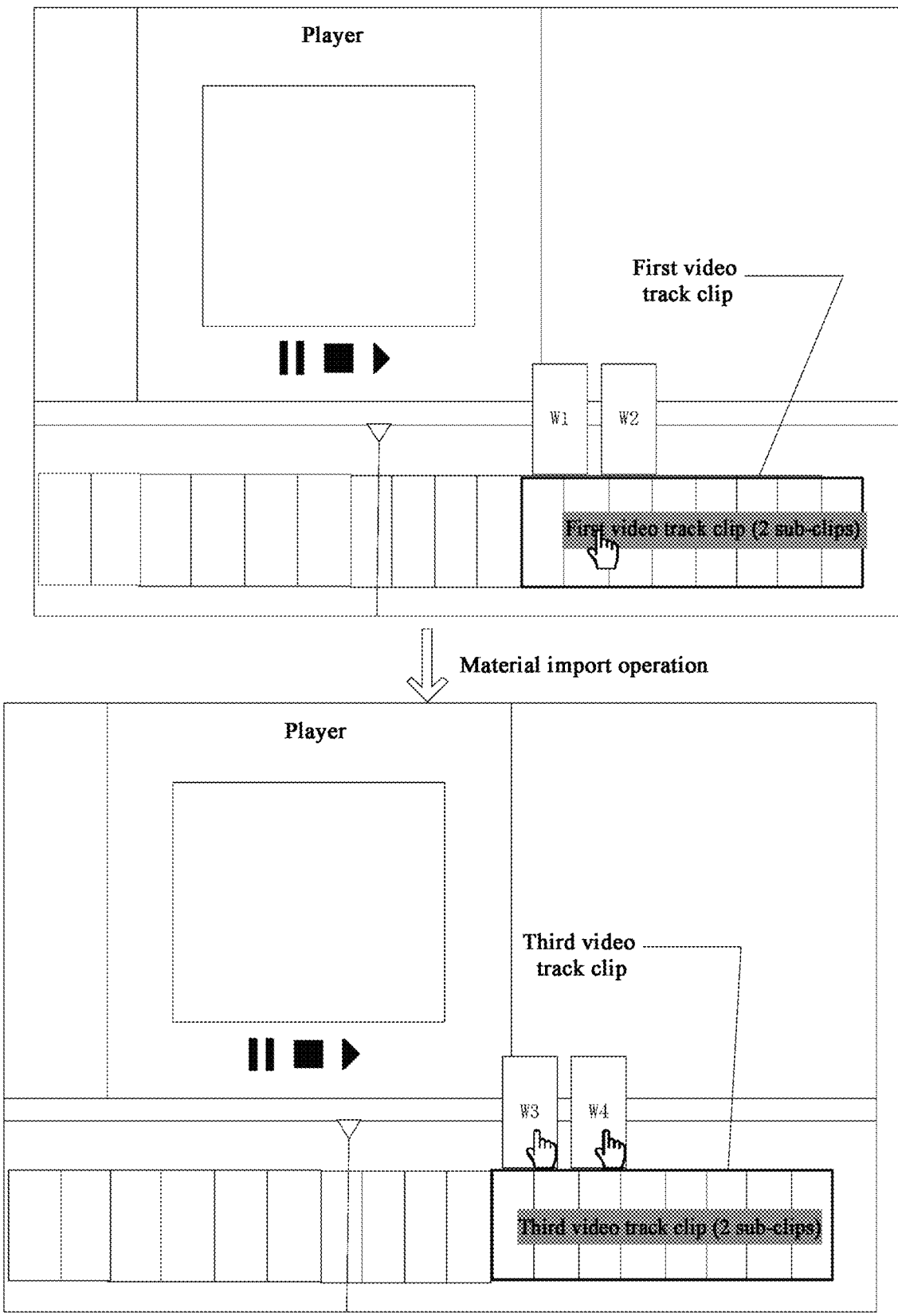
FIG. 7B is a schematic diagram of another video editing scenario provided according to an embodiment of the present disclosure.

For example, as shown in FIG. 7B, when the first video track clip is a composite track clip, the composite track clip includes a first sub-clip W1 and a second sub-clip W2. In response to a trigger operation for the first video track clip, W1 and W2 are displayed according to the timeline sequence. In response to a material import operation for W1, the first sub-clip W1 is replaced with a third sub-clip W3 in response to a first import operation for the first sub-clip. The third sub-clip corresponds to the fourth video track clip. The second sub-clip is replaced with a fourth sub-clip W4 in response to a material import operation for the second sub-clip W2. The fourth sub-clip W4 corresponds to the sixth video track clip formed by the fourth multimedia material. Accordingly, the first video track clip is replaced with the third video track clip, and the third video track clip corresponds to a combined clip of the fourth video track clip and the sixth video track clip. After the above material import operation, the first video track clip is replaced with the third video track clip, and the third video track clip corresponds to the combined clip of the fourth track clip and the sixth track clip, so that replacement of corresponding multiple sub-clips in the composite video track clip may be implemented.

In one embodiment of the present disclosure, the step of: in response to the material import operation for the first video track clip, replacing the first video track clip with the third video track clip to obtain the second multimedia data, may include:

in response to the material import operation for the first video track clip, displaying a material uploading entry, wherein a style of the material uploading entry may be set according to scenario requirements; and in response to an uploading operation for the second multimedia material selected for the material uploading entry, replacing the first video track clip with the third video track clip to obtain the second multimedia data.

Figure 8:
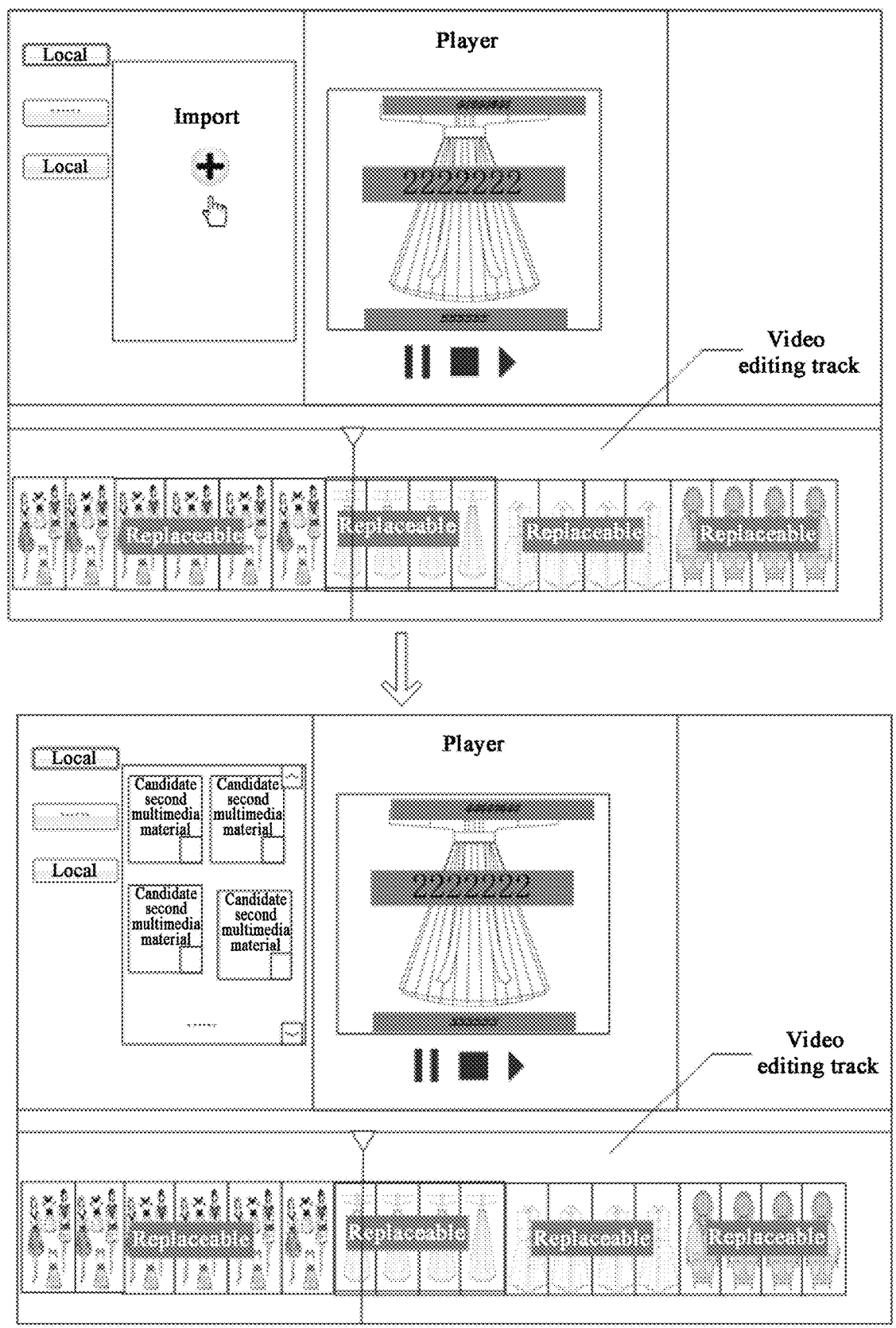
FIG. 8 is a schematic diagram of another video editing scenario provided according to an embodiment of the present disclosure.

That is, in the present embodiment, as shown in FIG. 8, an "import" control of a local material library may be provided on the video editing interface to serve as the material uploading entry. After the "import" control is triggered, candidate second multimedia materials corresponding to the corresponding local material library are displayed. In response to a trigger operation for the multiple candidate second multimedia materials, an uploading operation for the selected second multimedia material may be implemented.

In one embodiment of the present disclosure, the step of: in response to the material import operation for the first video track clip, replacing the first video track clip with the third video track clip to obtain the second multimedia data, may include: in response to an adding operation for the selected second multimedia material on a material panel, replacing the first video track clip with the third video track clip to obtain the second multimedia data. That is, in the present embodiment, multiple candidate second multimedia materials are displayed on the material panel. A selection operation may be performed for the candidate second multimedia materials to replace the first video track clip with the corresponding third video track clip to obtain the second multimedia data.

Figure 9:
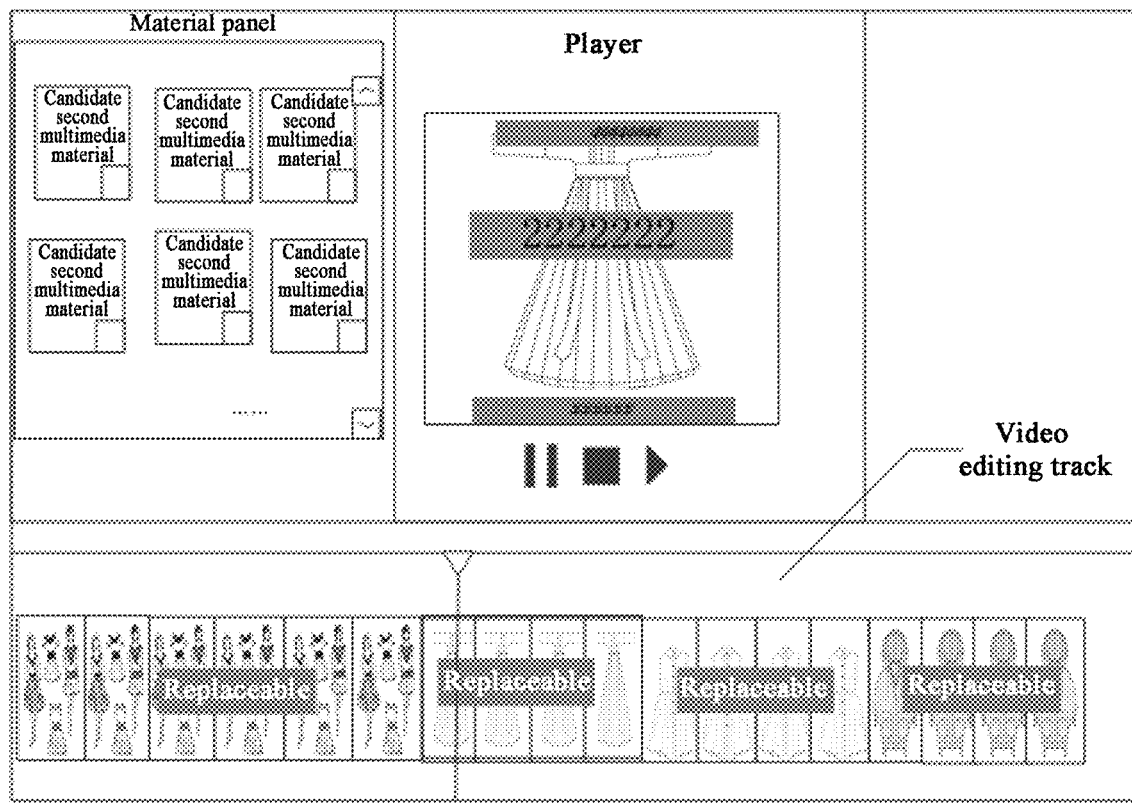
FIG. 9 is a schematic diagram of another video editing scenario provided according to an embodiment of the present disclosure.

In the present embodiment, as shown in FIG. 9, the import control may be displayed on each second multimedia material. For example, a "+" control is displayed. After the import control is triggered, the material panel is displayed, and multiple candidate second multimedia materials are displayed on the material panel. The selection operation may be performed for the candidate second multimedia materials, to replace the currently selected first video track clip with the corresponding third video track clip, so as to obtain the second multimedia data.

In the present embodiment, another operation mode may also be used to replace the second multimedia material. For example, in response to an operation of dragging the selected second multimedia material on the material panel to the first video track clip, the first video track clip may be replaced with the third video track clip to obtain the second multimedia data.

In addition, in the embodiments of the present disclosure, after the first video track clip is replaced with the third video track clip, the replaced third video track clip may also be replaced again. If a client currently executing an edition performs the edition for the first time, editing prompt guidance information and the like may be displayed in each step.

In summary, according to the video editing method in the embodiments of the present disclosure, the first video track clip may be replaced with the third video track clip in different manners according to different application scenarios, thereby further improving the flexibility of video editing.

Figure 10:
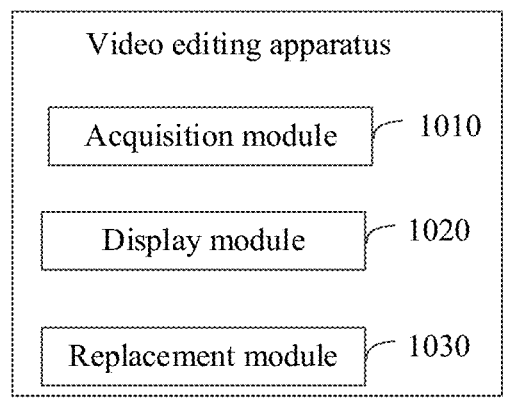
FIG. 10 is a schematic structural diagram of a video editing apparatus provided according to an embodiment of the present disclosure.

In order to implement the above embodiments, the present disclosure further provides a video editing apparatus. FIG. 10 is a schematic structural diagram of a video editing apparatus provided according to an embodiment of the present disclosure. The apparatus may be implemented by software and/or hardware, and may be generally integrated in an electronic device for video editing. As shown in FIG. 10, the video editing apparatus includes an acquisition module 1010, a display module 1020 and a replacement module 1030. The acquisition module 1010 is configured to acquire a video editing template, wherein the video editing template is generated based on first multimedia data, the first multimedia data includes at least one multimedia material and editing information, the editing information is configured to indicate an editing operation for the at least one multimedia material, the video editing template includes marking information, and the marking information is configured to indicate that a first multimedia material in the at least one multimedia material is marked as a replaceable material;

the display module 1020 is configured to display a video editing interface based on the video editing template, a video editing track based on a timeline is presented on the video editing interface, a first video track clip is presented on the video editing track, and the first video track clip corresponds to a second video track clip formed by the first multimedia material in the first multimedia data; and the replacement module 1030 is configured to: in response to a material import operation for the first video track clip, replace the first video track clip with a third video track clip to obtain second multimedia data; the third video track clip corresponds to a fourth video track clip that is formed by a second multimedia material indicated by the material import operation, the first video track clip and the third video track clip occupy the same timeline position on the video editing track;

wherein according to a comparison between the second multimedia data the first multimedia data, the first multimedia material in the first multimedia data is replaced with the second multimedia material in the second multimedia data.

The video editing apparatus provided according to embodiments of the present disclosure may perform the video editing method provided in any embodiment of the present disclosure, and has corresponding functional modules and advantages of performing the method, thus details are not described herein again.

In order to implement the above embodiments, the present disclosure further provides a computer program product, including a computer program/instructions, wherein the computer program/instructions, when being executed by a processor, may implement the video editing method in the above embodiments.

Figure 11:
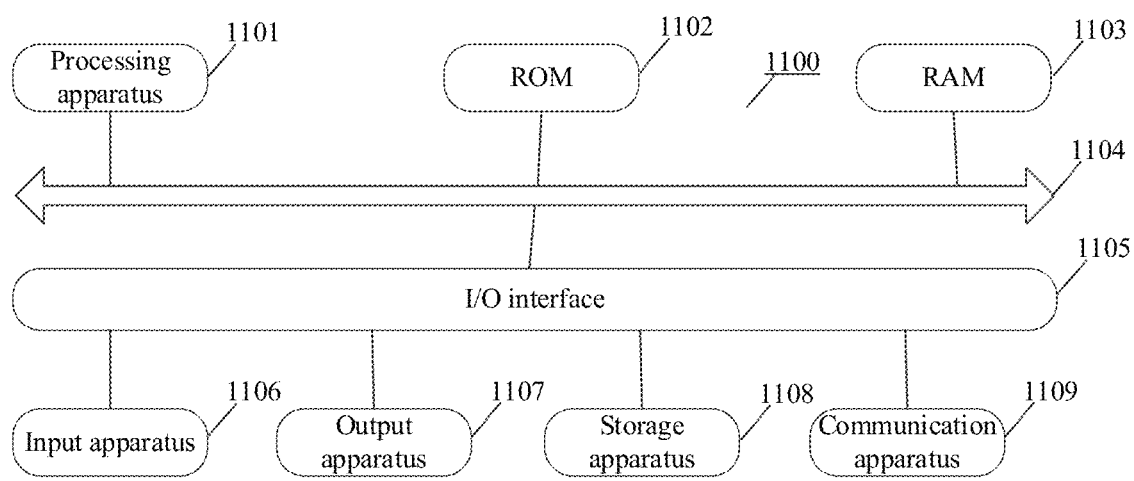
FIG. 11 is a schematic structural diagram of an electronic device provided according to an embodiment of the present disclosure.

FIG. 11 is a schematic structural diagram of an electronic device provided according to an embodiment of the present disclosure.

Specifically referring to FIG. 11, which illustrates a schematic structural diagram of an electronic device 1100 suitable for implementing the embodiments of the present disclosure. The electronic device 1100 according to embodiments of the present disclosure may include, but is not limited to, a mobile terminal such as a mobile phone, a notebook computer, a digital broadcast receiver, a Personal Digital Assistant (PDA), a Portable Android Device (PAD), a Portable Media Player (PMP), a vehicle-mounted terminal (e.g., a vehicle-mounted navigation terminal), and the like, and a fixed terminal such as a digital TV, a desktop computer, and the like. The electronic device shown in FIG. 11 is merely an example, and should not bring any limitation to the functions and use ranges of the embodiments of the present disclosure.

As shown in FIG. 11, the electronic device 1100 may include a processor (e.g., a central processing unit, a graphics processing unit or the like) 1101, which may perform various suitable actions and processes in accordance with a program stored in a read-only memory (ROM) 1102 or a program loaded from a memory 1108 into a random access memory (RAM) 1103. In the RAM 1103, various programs and data needed by the operations of the electronic device 1100 are also stored. The processor 1101, the ROM 1102 and the RAM 1103 are connected to each other via a bus 1104. An input/output (I/O) interface 1105 is also connected to the bus 1104.

In general, the following apparatuses may be connected to the I/O interface 1105: an input apparatus 1106, including, for example, a touch screen, a touch pad, a keyboard, a mouse, a camera, a microphone, an accelerometer, a gyroscope, and the like; an output apparatus 1107, including, for example, a liquid crystal display (LCD), a speaker, a vibrator, and the like; a memory 1108, including, for example, a magnetic tape, a hard disk, and the like; and a communication apparatus 1109. The communication apparatus 1109 may allow the electronic device 1100 to communicate in a wireless or wired manner with other devices to exchange data. While FIG. 11 illustrates the electronic device 1100 having various apparatuses, it is to be understood that not all illustrated apparatuses are required to be implemented or provided. More or fewer apparatuses may alternatively be implemented or provided.

In particular, according to the embodiments of the present disclosure, the processes described above with reference to the flowcharts may be implemented as computer software programs. For example, embodiments of the present disclosure include a computer program product, which includes a computer program carried on a non-transitory computer-readable medium, and the computer program contains program codes for performing the method illustrated in the flowcharts. In such embodiments, the computer program may be downloaded and installed from a network via the communication apparatus 1109, or installed from the memory 1108, or installed from the ROM 1102. When the computer program is executed by the processor 1101, the above functions defined in the method of the embodiments of the present disclosure are performed.

It should be noted that, the computer-readable medium described above in the present disclosure may be either a computer-readable signal medium or a computer-readable storage medium, or any combination thereof. The computer-readable storage medium may be, for example, but is not limited to, an electronic, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk-read-only memory (CD-ROM), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus or device. In the present disclosure, the computer-readable signal medium may include a data signal that is included in a baseband or is propagated as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in conjunction with the instruction execution system, apparatus or device. Program codes contained on the computer-readable medium may be transmitted with any suitable medium, including, but not limited to: an electrical wire, an optical cable, RF (radio frequency), and the like, or any suitable combination thereof.

In some embodiments, a client and a server may communicate using any currently known or future-developed network protocol, such as an HTTP (HyperText Transfer Protocol), and may be interconnected with any form or medium of digital data communication (e.g., a communication network). Examples of the communication network include a local area network ("LAN"), a wide area network ("WAN"), an international network (e.g., the Internet), and a peer-to-peer network (e.g., an ad hoc peer-to-peer network), as well as any currently known or future-developed networks.

The computer-readable medium may be contained in the above electronic device; and it may also be present separately and is not assembled into the electronic device.

The computer-readable medium carries one or more programs that, when being executed by the electronic device, cause the electronic device to:
acquire a video editing template, wherein the video editing template is generated based on first multimedia data, the first multimedia data includes at least one multimedia material and editing information, the editing information is configured to indicate an editing operation for the at least one multimedia material, the video editing template includes marking information, and the marking information is configured to indicate that a first multimedia material in the at least one multimedia material is marked as a replaceable material; display a video editing interface based on the video editing template, wherein a video editing track based on a timeline is presented on the video editing interface, a first video track clip is presented on the video editing track, and the first video track clip corresponds to a second video track clip formed by the first multimedia material in the first multimedia data; and in response to a material import operation for the first video track clip, replace the first video track clip with a third video track clip to obtain second multimedia data, wherein the third video track clip corresponds to a fourth video track clip that is formed by a second multimedia material indicated by the material import operation, the first video track clip and the third video track clip occupy the same timeline position on the video editing track; and according to a comparison between the second multimedia data the first multimedia data, the first multimedia material in the first multimedia data is replaced with the second multimedia material in the second multimedia data. Therefore, video editing based on the video editing template is implemented, and the efficiency and flexibility of video editing are improved.

The electronic device may compile computer program codes for executing the operations of the present disclosure in one or more programming languages or combinations thereof. The programming languages include, but not limited to, object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or the server. In the case involving the remote computer, the remote computer may be connected to the user computer through any type of network, including a local area network (LAN) or a wide area network (WAN), or it may be connected to an external computer (e.g., through the Internet using an Internet service provider).

The flowcharts and block diagrams in the drawings illustrate the system architecture, functions and operations of possible implementations of systems, methods and computer program products according to various embodiments of the present disclosure. In this regard, each block in the flowcharts or block diagrams may represent a part of a module, a program clip, or a code, which contains one or more executable instructions for implementing specified logical functions. It should also be noted that, in some alternative implementations, the functions noted in the block may occur out of the order noted in the drawings. For example, two blocks shown in succession may, in fact, be executed substantially concurrently, or the blocks may sometimes be executed in a reverse order, depending upon the functions involved. It should also be noted that each block in the block diagrams and/or flowcharts, and combinations of the blocks in the block diagrams and/or flowcharts may be implemented by dedicated hardware-based systems for performing specified functions or operations, or combinations of dedicated hardware and computer instructions.

The units involved in the described embodiments of the present disclosure may be implemented in a software or hardware manner. The names of the units do not constitute limitations of the units themselves in a certain case.

The functions described herein above may be performed, at least in part, by one or more hardware logic components. For example, without limitation, example types of the hardware logic components that may be used include: field programmable gate arrays (FPGAs), application-specific integrated circuits (ASICs), application-specific standard products (ASSPs), system on chips (SOCs), complex programmable logic devices (CPLDs), and so on.

In the context of the present disclosure, a machine-readable medium may be a tangible medium, which may contain or store a program for use by or in combination with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read-only memory (ROM), an erasable programmable read-only memory (EPROM or a flash memory), an optical fiber, a compact disc-read-only memory (CD-ROM), an optical storage device, a magnetic storage device, or any suitable combination thereof.

What have been described above are only preferred embodiments of the present disclosure and illustrations of the technical principles employed. It will be appreciated by those skilled in the art that the disclosure scope involved herein is not limited to the technical solutions formed by specific combinations of the above technical features, and meanwhile should also include other technical solutions formed by any combinations of the above technical features or equivalent features thereof, for example, technical solutions formed by mutual replacement of the above features with technical features having similar functions disclosed in the present disclosure (but is not limited to).

In addition, although various operations are depicted in a particular order, this should not be understood as requiring that these operations are performed in the particular order shown or in a sequential order. In certain circumstances, multitasking and parallel processing may be advantageous. Similarly, although several specific implementation details have been contained in the above discussion, these should not be construed as limiting the scope of the present disclosure. Certain features that are described in the context of separate embodiments may also be implemented in combination in a single embodiment. Conversely, various features that are described in the context of a single embodiment may also be implemented in a plurality of embodiments separately or in any suitable sub-combination.

Although the present theme has been described in a language specific to structural features and/or methodological actions, it is to be understood that the present theme defined in the appended claims is not necessarily limited to the specific features or actions described above. Rather, the specific features and actions described above are merely example forms of implementing the claims.

We claim:

1. A video editing method, comprising:
    acquiring a video editing template, wherein the video editing template is generated based on first multimedia data, the first multimedia data comprises at least one multimedia material and editing information, the editing information is configured to indicate an editing operation for the at least one multimedia material, the video editing template comprises marking information, the marking information is configured to indicate that a first multimedia material in the at least one multimedia material is marked as a replaceable material;
    displaying a video editing interface based on the video editing template, a video editing track based on a timeline is presented on the video editing interface, a first video track clip is presented on the video editing track, the first video track clip corresponds to a second video track clip formed by the first multimedia material in the first multimedia data; and
    in response to a material import operation for the first video track clip, replacing the first video track clip with a third video track clip to obtain second multimedia data, the third video track clip corresponds to a fourth video track clip that is formed by a second multimedia material indicated by the material import operation, the first video track clip and the third video track clip occupy the same timeline position on the video editing track;
    wherein according to a comparison between the second multimedia data and the first multimedia data, the first multimedia material in the first multimedia data is replaced with the second multimedia material in second multimedia data.

2. The method according to claim 1, wherein,
    the first video track clip is the second video track clip; or,
    the first video track clip is a video track clip generated by a target image frame in a freeze-frame manner, wherein the target image frame is a picture frame is in the first multimedia material.

3. The method according to claim 1, wherein the at least one multimedia material further comprises a third multimedia material;
    the first video track clip corresponds to a combined clip of the second video track clip and a fifth video track clip, wherein the fifth video track clip is a video track clip formed by the third multimedia material in the first multimedia data, and the second video track clip and the fifth video track clip have an overlapping portion on the timeline.

4. The method according to claim 3, wherein the in response to the material import operation for the first video track clip, replacing the first video track clip with the third video track clip, comprises:
    in response to a trigger operation for the first video track clip, displaying a first sub-clip and a second sub-clip of the second video track clip according to a timeline sequence, wherein the first sub-clip corresponds to the second video track clip, and the second sub-clip corresponds to the fifth video track clip;
    in response to a first import operation for the first sub-clip, replacing the first sub-clip with a third sub-clip, wherein the third sub-clip corresponds to the fourth video track clip;
    in response to a material import operation for the second sub-clip, replacing the second sub-clip with a fourth sub-clip, wherein the fourth sub-clip corresponds to a sixth video track clip formed by a fourth multimedia material; and replacing the first video track clip with the third video track clip, wherein the third video track clip corresponds to a combined clip of the fourth video track clip and the sixth video track clip, wherein the material import operation comprises a first import operation and a second import operation, the first import operation is configured to instruct to import the second multimedia material into the first sub-clip, and the second import operation is configured to instruct to import the fourth multimedia material into the second sub-clip.

5. The method according to claim 1, wherein the in response to the material import operation for the first video track clip, replacing the first video track clip with the third video track clip to obtain the second multimedia data, comprises:

in response to the material import operation for the first video track clip, displaying a material uploading entry; and in response to an uploading operation for the second multimedia material selected based on the material uploading entry, replacing the first video track clip with the third video track clip to obtain the second multimedia data.

6. The method according to claim 1, wherein the in response to the material import operation for the first video track clip, replacing the first video track clip with the third video track clip to obtain the second multimedia data, comprises:

in response to an adding operation for the selected second multimedia material on a material panel, replacing the first video track clip with the third video track clip to obtain the second multimedia data; or, in response to an operation of dragging the selected second multimedia material on the material panel to the first video track clip, replacing the first video track clip with the third video track clip to obtain the second multimedia data.

7. The method according to claim 1, wherein the replacing the first video track clip with the third video track clip to obtain the second multimedia data comprises:

comparing a first duration corresponding to the second multimedia material with a second duration of the first video track clip;

in response to the first duration being less than the second duration, slowing down the playback speed of the second multimedia material, such that a playback duration of the adjusted video clip equals to the second duration; and in response to the first duration being greater than the second duration, performing material interception starting from a first frame of the second multimedia material, so that the playback duration of a video clip generated by the intercepted second multimedia material equals to the second duration.

8. The method according to claim 1, wherein after the replacing the first video track clip with the third video track clip to obtain the second multimedia data, the method further comprises:

in response to a trigger operation for the second multimedia data, displaying a material editing area; and
editing the second multimedia data in the material editing area.

9. The method according to claim 1, further comprising:
displaying at least one replaceable text clip in the first multimedia data in a text area on the video editing interface;

in response to a selection operation for a selected target text clip in the text area, marking at least one video frame on the video editing track based on the timeline, wherein the video frame corresponds to a position where the target text clip is played in the first multimedia data; and in response to an editing operation for the target text clip, synchronously displaying an edited text clip in a video player.

10. The method according to claim 1, wherein,
another clipping track for editing the first video track clip are further presented on the video editing interface, or,
another clipping tracks for editing the third video track clip are further presented on the video editing interface.

11. The method according to claim 1, further comprising:
in response to a video export operation, verifying whether the first video track clip is replaced with the third video track clip;

in response to the replacement being completed, generating a target video based on the second multimedia data; and in response to the replacement being not completed, performing replacement guidance prompt on the first video track clip.

12. An electronic device, wherein the electronic device comprises:
a processor; and
a memory for storing processor-executable instructions; and the processor is configured to read the processor-executable instructions from the memory, and executes the processor-executable instructions to cause the electronic device to:

acquire a video editing template, wherein the video editing template is generated based on first multimedia data, the first multimedia data comprises at least one multimedia material and editing information, the editing information is configured to indicate an editing operation for the at least one multimedia material, the video editing template comprises marking information, the marking information is configured to indicate that a first multimedia material in the at least one multimedia material is marked as a replaceable material;

display a video editing interface based on the video editing template, a video editing track based on a timeline is presented on the video editing interface, a first video track clip is presented on the video editing track, the first video track clip corresponds to a second video track clip formed by the first multimedia material in the first multimedia data; and in response to a material import operation for the first video track clip, replace the first video track clip with a third video track clip to obtain second multimedia data, the third video track clip corresponds to a fourth video track clip that is formed by a second multimedia material indicated by the material import operation, the first video track clip and the third video track clip occupy the same timeline position on the video editing track;

wherein according to a comparison between the second multimedia data and the first multimedia data, the first multimedia material in the first multimedia data is replaced with the second multimedia material in second multimedia data.

13. The electronic device of claim 12, wherein
the first video track clip is the second video track clip; or,
the first video track clip is a video track clip generated by a target image frame in a freeze-frame manner, wherein the target image frame is a picture frame is in the first multimedia material.

14. The electronic device according to claim 12, wherein the at least one multimedia material further comprises a third multimedia material;
the first video track clip corresponds to a combined clip of the second video track clip and a fifth video track clip, wherein the fifth video track clip is a video track clip formed by the third multimedia material in the first multimedia data, and the second video track clip and the fifth video track clip have an overlapping portion on the timeline.

15. The electronic device according to claim 12, wherein the electronic device being caused to in response to the material import operation for the first video track clip, replace the first video track clip with the third video track clip to obtain the second multimedia data, is further caused to:
in response to the material import operation for the first video track clip, display a material uploading entry; and
in response to an uploading operation for the second multimedia material selected based on the material uploading entry, replace the first video track clip with the third video track clip to obtain the second multimedia data.

16. The electronic device according to claim 12, wherein the electronic device being caused to in response to the material import operation for the first video track clip, replace the first video track clip with the third video track clip to obtain the second multimedia data, is further caused to:
in response to an adding operation for the selected second multimedia material on a material panel, replace the first video track clip with the third video track clip to obtain the second multimedia data; or,
in response to an operation of dragging the selected second multimedia material on the material panel to the first video track clip, replace the first video track clip with the third video track clip to obtain the second multimedia data.

17. The electronic device according to claim 12, wherein electronic device being caused to replace the first video track clip with the third video track clip to obtain the second multimedia data is further caused to:
compare a first duration corresponding to the second multimedia material with a second duration of the first video track clip;
in response to the first duration being less than the second duration, slow down the playback speed of the second multimedia material, such that a playback duration of the adjusted video clip equals to the second duration; and
in response to the first duration being greater than the second duration, perform material interception starting from a first frame of the second multimedia material, so that the playback duration of a video clip generated by the intercepted second multimedia material equals to the second duration.

18. The electronic device according to claim 12, wherein after the electronic device being caused to replace the first video track clip with the third video track clip to obtain the second multimedia data, the electronic device is further caused to:
in response to a trigger operation for the second multimedia data, display a material editing area; and
edit the second multimedia data in the material editing area.

19. The electronic device according to claim 12, wherein the electronic device is further caused to:
display at least one replaceable text clip in the first multimedia data in a text area on the video editing interface;
in response to a selection operation for a selected target text clip in the text area, mark at least one video frame on the video editing track based on the timeline, wherein the video frame corresponds to a position where the target text clip is played in the first multimedia data; and
in response to an editing operation for the target text clip, synchronously display an edited text clip in a video player.

20. A non-transitory computer-readable storage medium, wherein the storage medium stores a computer program, the computer program, when being executed by a processor, causes the processor to:
acquire a video editing template, wherein the video editing template is generated based on first multimedia data, the first multimedia data comprises at least one multimedia material and editing information, the editing information is configured to indicate an editing operation for the at least one multimedia material, the video editing template comprises marking information, the marking information is configured to indicate that a first multimedia material in the at least one multimedia material is marked as a replaceable material;
display a video editing interface based on the video editing template, a video editing track based on a timeline is presented on the video editing interface, a first video track clip is presented on the video editing track, the first video track clip corresponds to a second video track clip formed by the first multimedia material in the first multimedia data; and
in response to a material import operation for the first video track clip, replace the first video track clip with a third video track clip to obtain second multimedia data, the third video track clip corresponds to a fourth video track clip that is formed by a second multimedia material indicated by the material import operation, the first video track clip and the third video track clip occupy the same timeline position on the video editing track;
wherein according to a comparison between the second multimedia data and the first multimedia data, the first multimedia material in the first multimedia data is replaced with the second multimedia material in second multimedia data.

* * * * *